United States Patent
Barzik et al.

(10) Patent No.: US 10,642,903 B2
(45) Date of Patent: May 5, 2020

(54) TAGGING AND QUERYING SYSTEM OBJECTS

(71) Applicant: INTERNATIONAL BUSINESS MACHINES CORPORATION, Armonk, NY (US)

(72) Inventors: Zah Barzik, Rishon LeZion (IL); Lior Chen, Jerusalem (IL); Dan Cohen, Tel Aviv (IL); Amit Margalit, Hod-Hasharon (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 395 days.

(21) Appl. No.: 14/500,314

(22) Filed: Sep. 29, 2014

(65) Prior Publication Data

US 2016/0092568 A1    Mar. 31, 2016

(51) Int. Cl.
*G06F 16/951* (2019.01)
*G06F 16/248* (2019.01)
*G06F 16/28* (2019.01)

(52) U.S. Cl.
CPC .......... *G06F 16/951* (2019.01); *G06F 16/248* (2019.01); *G06F 16/285* (2019.01)

(58) Field of Classification Search
USPC ........................................................ 707/722
See application file for complete search history.

(56) References Cited

U.S. PATENT DOCUMENTS

| | | | |
|---|---|---|---|
| 7,478,228 B2 | 1/2009 | Stempel et al. | |
| 7,483,890 B2 | 1/2009 | Zhou et al. | |
| 7,912,933 B2 | 3/2011 | Wright et al. | |
| 8,024,704 B2 | 9/2011 | Meijer | |
| 8,204,888 B2 | 6/2012 | Frieden et al. | |
| 9,094,299 B1* | 7/2015 | Rao D.S. | H04L 41/0813 |
| 9,110,599 B1* | 8/2015 | Fair | G06F 3/0644 |

(Continued)

OTHER PUBLICATIONS

Malik et al., "Benchmarking Cloud-Based Tagging Services" pp. 231-238, Computation Institute, University of Chicago and Argonne National Laboratory, ICDE Workshops 2014.

(Continued)

*Primary Examiner* — Muluemebet Gurmu
(74) *Attorney, Agent, or Firm* — Griffiths & Seaton PLLC

(57) ABSTRACT

Methods, computing systems and computer program products implement embodiments of the present invention that include defining multiple group names, and identifying multiple system objects in a computer system such as a storage system. Examples of system objects include physical objects such as storage devices, network objects such as IP addresses, and logical objects such as logical volumes. Each of the system devices is tagged with a given group name, and upon receiving a query including a condition and an operation, one or more of the system devices matching the condition are identified, and the operation is performed on the one or more identified system objects. In some embodiments, the operation may include retrieving a parameter associated with the one or more identified system objects, and presenting a result of the query. In alternative embodiments, the operation may include updating a parameter associated with the one or more identified system objects.

14 Claims, 3 Drawing Sheets

(56) References Cited

U.S. PATENT DOCUMENTS

| | | | |
|---|---|---|---|
| 2003/0154278 A1* | 8/2003 | Hirschman | H04L 43/0876 709/224 |
| 2008/0196046 A1* | 8/2008 | Athas et al. | G06F 16/9577 707/E17.121 |
| 2008/0288862 A1 | 11/2008 | Smetters et al. | |
| 2009/0164267 A1* | 6/2009 | Banatwala | G06F 17/30997 707/736 |
| 2010/0049735 A1* | 2/2010 | Hsu | G06F 17/30138 707/E17.005 |
| 2013/0263033 A1 | 10/2013 | Tov et al. | |
| 2013/0275414 A1 | 10/2013 | Srivastava et al. | |
| 2014/0081792 A1 | 3/2014 | Chatterton | |
| 2014/0149406 A1 | 5/2014 | Bush et al. | |

OTHER PUBLICATIONS

Anonymous, "Technique for Dynamic Tagging of Content", Jan. 28, 2014, 4 pages, IP.com. IPCOM000234687D.

Chukmol et al., "Bringing Socialized Semantics Into Web Services Based on User-Centric Collaborative Tagging and Usage Experience" pp. 450-455Université de Lyon, France.

* cited by examiner

TAGGING AND QUERYING SYSTEM OBJECTS

FIELD OF THE INVENTION

The present invention relates generally to storage system management, and specifically to providing a method for tagging and querying devices managed by a storage system.

BACKGROUND

Computer systems such as storage systems typically manage a large variety of system objects such as physical objects, network objects and logical objects. Each of the system objects can be used for a specific purpose and/or task. Examples of physical objects include storage devices, memory modules and processors, examples of network objects include network interface cards (NICs) and Internet Protocol (IP) addresses, and examples of logical objects include logical volumes, folders and filesets.

The description above is presented as a general overview of related art in this field and should not be construed as an admission that any of the information it contains constitutes prior art against the present patent application.

SUMMARY

There is provided, in accordance with an embodiment of the present invention a method, including defining multiple group names, managing, by a computer, a plurality of system devices, tagging each of the system devices with a given group name, receiving a query including a condition and an operation, identifying one or more of the system devices matching the condition, and performing the operation on the one or more identified system devices There is also provided, in accordance with an embodiment of the present invention an apparatus, including a plurality of system devices, and a processor configured to define multiple group names, to tag each of the system devices with a given group name, to receive a query including a condition and an operation, to identify one or more of the system devices matching the condition, and to perform the operation on the one or more identified system devices.

There is further provided, in accordance with an embodiment of the present invention a computer program product, the computer program product including a non-transitory computer readable storage medium having computer readable program code embodied therewith, the computer readable program code including computer readable program code configured to define multiple group names, computer readable program code configured to manage a plurality of system devices, computer readable program code configured to tag each of the system devices with a given group name, computer readable program code configured to receive a query including a condition and an operation, computer readable program code configured to identify one or more of the system devices matching the condition, and computer readable program code configured to perform the operation on the one or more identified system devices.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

Computer systems typically classify devices according to their types. For example, in a storage system having system devices such as a network object comprising a set of multiple Internet Protocol (IP) addresses, the storage system typically individually manages a given IP address or individually manages a device associated with the given IP address. However, in operation, users may have specific designations to different subsets of the IP addresses. For example, a first subset of the IP addresses may be used to access a first set of specific volumes, folders and exports, while a second subset of IP addresses may be used to access a second set of volumes, folders, and exports.

Embodiments of the present invention provide methods and systems for tagging and querying system devices (also referred to herein as system objects) according to their intended use. In some embodiments, one or more predefined tags, free-text tags or automatically generated tags can be associated with each of the system objects, and a system administrator can use the tags when querying the system objects. As explained hereinbelow, the tags may comprise group names. The queries can retrieve information (e.g., usage statistics and operational statuses) about the tagged system objects or can update parameters (e.g., set storage quotas) for the tagged system objects.

As explained hereinbelow, upon defining multiple group names and identifying a plurality of system objects that are managed by a computer system, the computer system can tag each of the system objects with one or more of the group names. The computer system can then process a query comprising a condition and an operation. Upon receiving the query, the computer system can identify one or more of the system objects matching the condition, and perform the operation on the identified one or more system objects.

For example, if multiple folders in a logical volume are tagged with a group name "QA", and each of the folders is assigned a respective storage quota, then the computer system can process a first query to identify the storage utilization levels of the folders. Upon analyzing the results of the first query, a system administrator can then issue a second query that increases the storage quota for one or more of the folders identified by the query. For example, the query may increase the storage quota for a specific folder, or increase the storage quota for any of the identified folders whose storage utilization exceeds a specified threshold (e.g., 85%).

Figure 1:
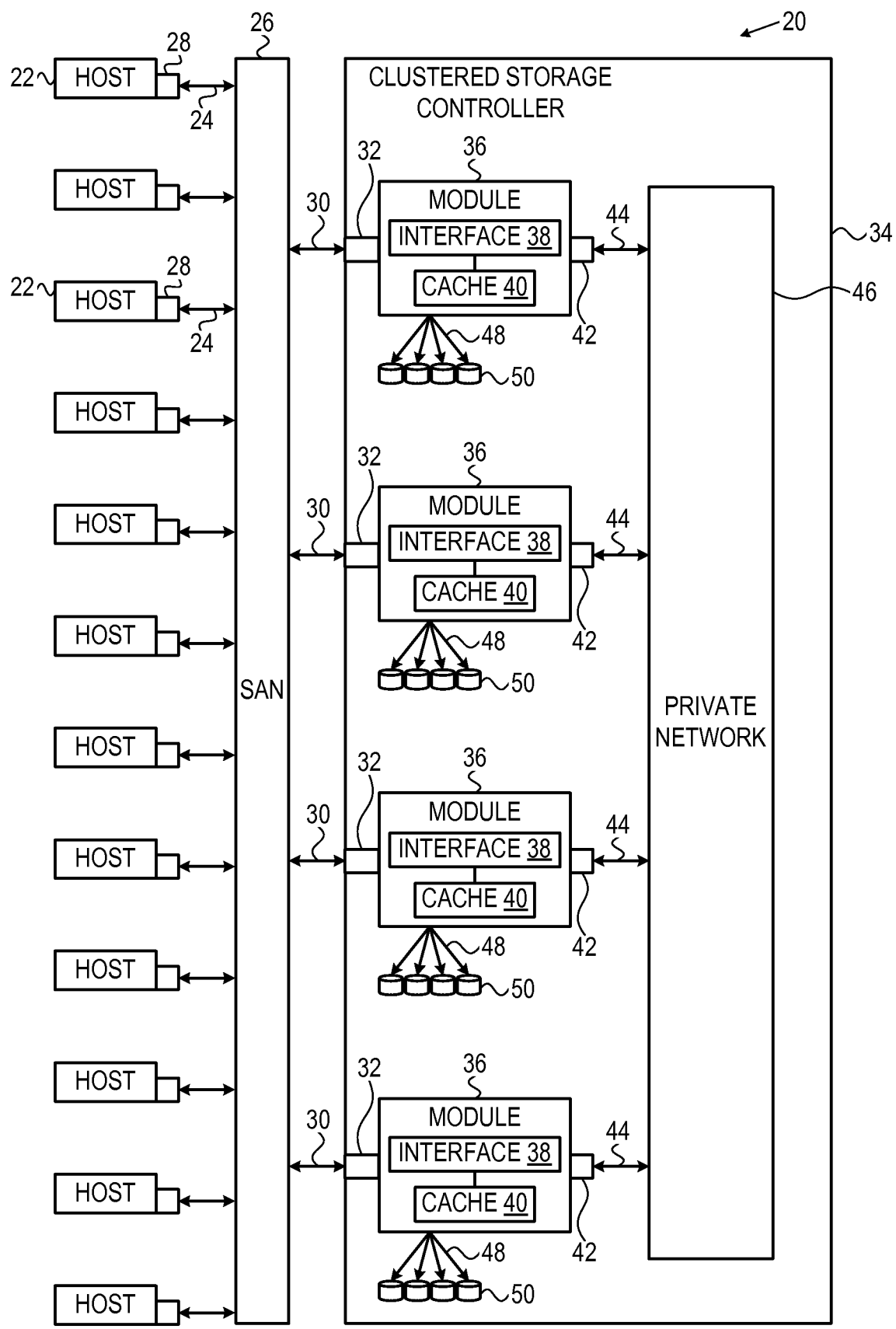
FIG. 1 is a block diagram that schematically illustrates a storage system comprising a storage controller, in accordance with an embodiment of the present invention.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, or solid state drives (SSDs) which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

Figure 2:
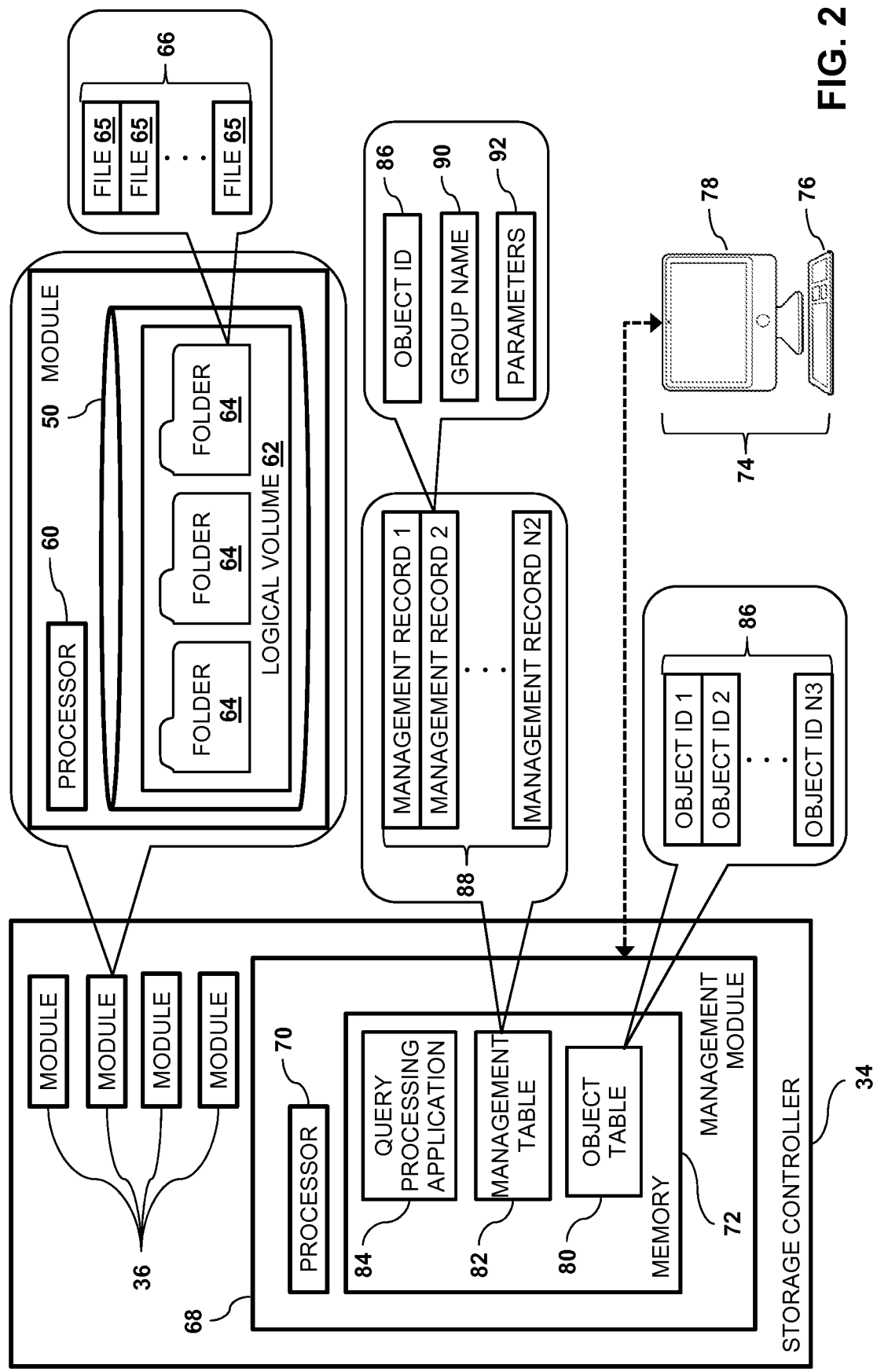
FIG. 2 is a block diagram that schematically illustrates a given storage controller configured to tag and query system objects, in accordance with an embodiment of the present invention.

FIG. 2 is a block diagram that schematically illustrates a given storage controller 34 configured to tag and query system objects, in accordance with an embodiment of the present invention. In embodiments of the present invention, a given system object may comprise a hardware object, a network object, or a logical object. Examples of hardware objects, network objects and logical objects are described hereinbelow.

Each module 36 comprises a module processor 60 and one or more storage devices 50 that are configured to store one or more logical volumes 62. In the example shown in FIG. 2, logical volume 62 comprises multiple folders 64 that store one or more files 65. In embodiments described herein, a fileset 66 comprises a plurality of files 65 typically stored in a given folder 64.

In addition to modules 36, storage controller 34 comprises a management module 68 that manages modules 36. Management module 68 comprises a management processor 70 and a memory 72. Although not explicitly shown in FIG. 2 for purposes of illustrative simplicity, management module 68 can communicate with modules 36 via private network 46.

Management module 68 communicates a console 74 that comprises an input device such as a keyboard 76 and an output device such as a display 78. In embodiments of the present invention, a system administrator (not shown) can enter a system object query via keyboard 76, and processor 70 can present the query's results on display 78.

Memory 72 stores a system object table 80, a management table 82, and a query processing application 84. System object table 80 comprises multiple system object identifiers 86, wherein each of the system object identifiers corresponds to a given system object in system 20. In embodiments of the present invention, the system objects comprise physical objects, network objects and logical objects. Examples of physical objects include, but are not limited to, caches 40, storage devices 50, and processors 60. Examples of network objects include, but are not limited to, adapters 28, 32 and 42, and physical IP addresses of the adapters. Examples of logical objects include, but are not limited to, logical IP addresses, logical volumes 62, folders 64 and filesets 66.

Management table 82 comprises multiple management records 88, and each of the management records comprises a given object identifier 86, a group name 90 and parameters 92. While embodiments herein describe tagging a given system object with a given group name, tagging the system object with any identifier is considered to be within the spirit and scope of the present invention In embodiments of the present invention, a system administrator can input, via console 74, a given group name 90 for a given system object identifier 86. In operation processor 70 can maintain parameters 92 for a given object identifier 86. In a first example, if the given object identifier comprises a given folder 64, parameters 92 may comprise information such as how much storage space (e.g., megabytes) is currently being used by files 65 in the given folder, and how much storage space is allocated to the given folder. In a second example, if the given object identifier comprises an IP address, the parameters may comprise information such as a data throughput rate for the IP address.

Query processing application 84 comprises a software application that can receive and process queries on the system objects. To process queries, query processing application 84 may implement a domain-specific language comprising instructions that are evaluated via a scripting language, thereby generating a script which runs the requested operations through the management module's command line interface (CLI). In some embodiments, query processing application 84 may include a user interface for console 74.

The following are examples of keywords that can be included in the domain-specific include:
  OR, AND, NOT: Logical operators used to define predicates.
  IN: Generates a collection of system objects whose one or more tags comply with an input predicate.
  DO: Initiates a scope of operations which processor 60 can perform iteratively.
  SET(property, value): Sets a property (if it exists in the system object) to an evaluated value.
  CLEAR: Sets a property to its default value.
  SUM(property): Sums all evaluated values in a collection.
  MAX(property): Returns a maximum value from a collection.
  MIN(property): Returns a minimum value from a collection.
  EQUALS(property, value): Returns a subset of system objects for which the property exists and is equal to the evaluated value.
  MORE(property, value): Returns a subset of system objects for which the property exists and is larger than the evaluated value.
  LESS(property, value): Returns a subset of system objects for which the system property exists and is smaller than the evaluated value.
  MEAN(property): Calculates a mean value for evaluated values in a collection.

In some embodiments, a given query may retrieve one or more parameters associated with one or more given system objects. For example, to process the query $$\text{SUM 'quota' IN ('QA' OR 'development')} \quad (1)$$

application 84 iterates over all the system objects, and accumulates the value of the property "quota" for each of the system objects which has a property "quota", and is tagged with either "QA" or "development".

In alternative embodiments, a given query may update one or more parameters associated with one or more given system objects. For example, to process the query $$\text{IN ('QA' OR 'development') DO SET('quota', 'quota'*2)} \quad (2)$$

application 84 can iterate over all the system objects, and identify the system objects having a "quota" property and tagged with either "QA" or "development", and double the quotas of the identified system objects.

In embodiments of the present invention, the system objects may be organized hierarchically as parent and child system objects, wherein child system objects can "inherit" the tag of its respective parent system object. In a first example, if a given folder 64 (i.e., a child system object) does not have a storage quota, then the storage quota for logical volume 62 (i.e., the respective parent system object).

In a second example, a given folder 64 has a storage quota of five gigabytes and currently stores files 65 utilizing two gigabytes of storage space. If logical volume has a storage quota of 20 gigabytes, but the other folders are storing files 65 utilizing 17 gigabytes of storage space, the given folder will only be able to store an additional one gigabyte of data (i.e., since the available quota for the logical volume is less that the available quota for the given folder).

Processors 60 and 70 may comprise general-purpose central processing units (CPU) or special-purpose embedded processors, which are programmed in software or firmware to carry out the functions described herein. The software may be downloaded to modules 36 and 68 in electronic form, over a network, for example, or it may be provided on non-transitory tangible media, such as optical, magnetic or electronic memory media. Alternatively, some or all of the functions of the processors may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Managing Tagged System Objects

Figure 3:
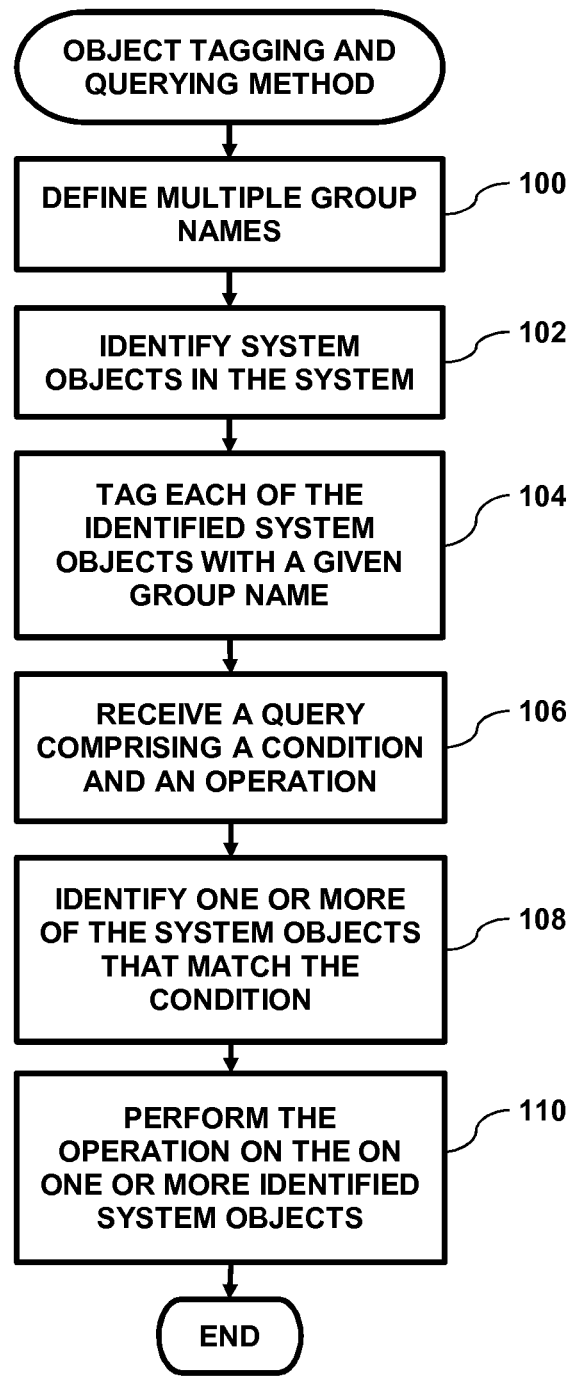
FIG. 3 is a flow diagram that schematically illustrates a method of tagging and querying the system objects, in accordance with an embodiment of the present invention.

FIG. 3 is a flow diagram that schematically illustrates a method of tagging and querying the system objects, in accordance with an embodiment of the present invention, in accordance an embodiment of the present invention. In a definition step 100, processor 70 defines multiple group names. In some embodiments, a system administrator can input the group names via keyboard 76, and processor 70 can store the group names to memory 72.

In an identification step 102, processor 70 identifies system objects (i.e., physical objects, network objects and logical objects) in system 20, and stores a given system object identifier 86 for each of the identified system objects to system object table 80. In some embodiments, processor 70 can identify the given system object identifier by accessing metadata associated with the given system object. For example, metadata for a given folder 64 may comprise a folder name.

In a tagging step 104, the management processor tags each of the identified system objects with one or more of the group names. In some embodiments, processor 70 can present system object identifiers 86 and the defined group names on display 78 and tag (i.e., associate) a given system object with a given group name based on input received from a system administrator via keyboard 74. Upon tagging the given system object, processor 70 updates group name 90 in the management record associated with the given system object with the tagged group name. In embodiments where a given system object is tagged with multiple group names, a separate management record 88 can be stored for each combination of the given system object and a given group name that is tagged to the given system object.

In a receive step 106, processor 70 receives a query comprising a condition and an operation. For example, in query (1) described supra, the condition comprises "IN ('QA' OR 'development')" and the operation comprises "SUM 'quota'". Processor 70 identifies one or more of the system objects that match the condition in an identification step 108 performs the operation on the one or more identified objects in a perform step 110, and the method ends.

In some embodiments, processor 70 can present a result of the query on display 78. For example, if the query retrieves parameters associated with one or more of the system objects, processor 70 can present a query result (e.g., a calculation or a list of system objects that match the condition). Likewise, if the query updates the parameters of one or more of the system objects, processor 70 can present a completion message upon updating the parameters.

While embodiments herein describe management module 72 managing a plurality of devices (i.e., system objects) in a storage system such as storage controller 34, other types of computers that manage multiple devices are considered to be within the spirit and scope of the present invention. In addition to storage controller 34, embodiments of the present invention can be used to manage devices in computer systems such as data center management systems, other types of storage systems and network management systems.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
defining multiple group names;
managing, by a computer, a plurality of system devices, the system devices comprising system objects including at least physical objects, network objects, and logical objects; wherein the computer manages the plurality of system devices by identifying each of the system devices and storing a given system object identifier in a system object table for each of the identified system devices;
tagging each of the system devices with a given group name;
receiving a query comprising a condition and an operation comprising a storage quota operation, the query including at least usage statistics and operational statuses of one or more of the system devices, and the condition comprising a script language command for performing the operation upon the condition being met; wherein the script language command further includes an update command to update a parameter associated with one or more of the system objects, the updated parameter corresponding to an update to the storage quota operation; and wherein, upon executing the script language command according to the query, each of the one or more of the system objects are iterated through in the computer to locate those of the one or more of the system devices tagged with the given group name such that the update command is applied to all of the located one or more of the system devices tagged with the given group name;
identifying the one or more of the system devices matching the condition; and
performing the operation on the one or more identified system devices; wherein the system objects of the system devices are arranged in a hierarchal order as parent objects and child objects, each of the child objects inheriting a respective tag of the parent objects such that a storage quota of the parent objects is implemented within each of the child objects dependent thereon, and wherein performing the operation includes performing the storage quota operation on both the parent objects and the child objects.

2. The method according to claim 1, wherein the computer comprises a storage system.

3. The method according to claim 1, wherein tagging each of the child system objects comprises tagging its respective parent system object.

4. The method according to claim 1, wherein performing the operation comprises retrieving the parameter associated with the one or more identified system objects, and presenting a result of the query.

5. The method according to claim 1, and comprising defining, in a memory a table comprising a respective entry for each of the identified system objects, and wherein tagging a given system object comprises storing the given group name to the respective entry for the given system object.

6. An apparatus, comprising:
a plurality of system devices, the system devices comprising system objects including at least physical objects, network objects, and logical objects; wherein each of the plurality of system devices are managed by identifying each of the system devices and storing a given system object identifier in a system object table for each of the identified system devices; and
a processor configured:
to define multiple group names,
to tag each of the system devices with a given group name,
to receive a query comprising a condition and an operation comprising a storage quota operation, the query including at least usage statistics and operational statuses of one or more of the system devices, and the condition comprising a script language command for performing the operation upon the condition being met; wherein the script language command further includes an update command to update a parameter associated with one or more of the system objects, the updated parameter corresponding to an update to the storage quota operation; and wherein, upon executing the script language command according to the query, each of the one or more of the system objects are iterated through in the computer to locate those of the one or more of the system devices tagged with the given group name such that the update command is applied to all of the located one or more of the system devices tagged with the given group name, to identify the one or more of the system devices matching the condition, and to perform the operation on the one or more identified system devices; wherein the system objects of the system devices are arranged in a hierarchal order as parent objects and child objects, each of the child objects inheriting a respective tag of the parent objects such that a storage quota of the parent objects is implemented within each of the child objects dependent thereon, and wherein performing the operation includes performing the storage quota operation on both the parent objects and the child objects.

7. The apparatus according to claim 6, wherein the processor and the plurality of devices comprises a storage system.

8. The apparatus according to claim 6, wherein the processor is configured to tag each of the child system objects by tagging its respective parent system object.

9. The apparatus according to claim 6, wherein the processor is configured to perform the operation by retrieving the parameter associated with the one or more identified system objects.

10. The apparatus according to claim 6, and comprising a memory, and wherein the processor is configured to define, in the memory a table comprising a respective entry for each of the identified system objects, and to tag a given object comprises by the given group name to the respective entry for the given system object.

11. A computer program product, the computer program product comprising:

a non-transitory computer readable storage medium having computer readable program code embodied therewith, the computer readable program code comprising:

computer readable program code configured to define multiple group names;

computer readable program code configured to manage a plurality of system devices, the system devices comprising system objects including at least physical objects, network objects, and logical objects; wherein the computer manages the plurality of system devices by identifying each of the system devices and storing a given system object identifier in a system object table for each of the identified system devices;

computer readable program code configured to tag each of the system devices with a given group name;

computer readable program code configured to receive a query comprising a condition and an operation comprising a storage quota operation, the query including at least usage statistics and operational statuses of one or more of the system devices, and the condition comprising a script language command for performing the operation upon the condition being met; wherein the script language command further includes an update command to update a parameter associated with one or more of the system objects, the updated parameter corresponding to an update to the storage quota operation; and wherein, upon executing the script language command according to the query, each of the one or more of the system objects are iterated through in the computer to locate those of the one or more of the system devices tagged with the given group name such that the update command is applied to all of the located one or more of the system devices tagged with the given group name;

computer readable program code configured to identify the one or more of the system devices matching the condition; and computer readable program code configured to perform the operation on the one or more identified system devices; wherein the system objects of the system devices are arranged in a hierarchal order as parent objects and child objects, each of the child objects inheriting a respective tag of the parent objects such that a storage quota of the parent objects is implemented within each of the child objects dependent thereon, and wherein performing the operation includes performing the storage quota operation on both the parent objects and the child objects.

12. The computer program product according to claim 11, wherein the computer readable program code is configured to tag each of the child system objects by tagging its respective parent system object.

13. The computer program product according to claim 11, wherein the computer readable program code is configured to perform the operation by retrieving the parameter associated with the one or more identified system objects, and to present a result of the query.

14. The computer program product according to claim 11, and comprising computer readable program code configured to define, in a memory a table comprising a respective entry for each of the identified system objects, and wherein the computer readable program code is configured to tag a given system object by storing the given group name to the respective entry for the given system object.

* * * * *